(12) United States Patent
Kazama et al.

(10) Patent No.: US 9,939,584 B2
(45) Date of Patent: Apr. 10, 2018

(54) BASE MEMBER USED FOR FUSION SPLICER FOR JOINING OPTICAL FIBERS AND FUSION SPLICER

(71) Applicants: FURUKAWA ELECTRIC CO., LTD., Tokyo (JP); SEIWA GIKEN INC., Shinagawa-ku (JP)

(72) Inventors: Junichi Kazama, Tokyo (JP); Tomohiro Akiyama, Tokyo (JP); Takashi Tanaka, Shinagawa-ku (JP)

(73) Assignees: FURUKAWA ELECTRIC CO., LTD., Tokyo (JP); SEIWA GIKEN INC., Shinagawa-ku (JP)

( * ) Notice: Subject to any disclaimer, the term of this patent is extended or adjusted under 35 U.S.C. 154(b) by 0 days.

(21) Appl. No.: 15/429,580

(22) Filed: Feb. 10, 2017

(65) Prior Publication Data
US 2017/0235054 A1 Aug. 17, 2017

(30) Foreign Application Priority Data
Feb. 12, 2016 (JP) .................................. 2016-024886

(51) Int. Cl.
*G02B 6/255* (2006.01)

(52) U.S. Cl.
CPC ......... *G02B 6/2555* (2013.01); *G02B 6/2553* (2013.01)

(58) Field of Classification Search
CPC ..... G02B 6/255; G02B 6/2553; G02B 6/2555
USPC .............................. 385/88–96, 100, 136, 147
See application file for complete search history.

(56) References Cited

U.S. PATENT DOCUMENTS

| 4,276,113 A | * | 6/1981 | Carlsen | G02B 6/255 156/158 |
| 4,715,876 A | * | 12/1987 | Osaka | G02B 6/25 385/85 |
| 5,457,765 A | * | 10/1995 | Suzuki | G02B 6/2551 385/137 |
| 5,524,163 A | | 6/1996 | Kobayashi et al. | |
| 6,034,718 A | | 3/2000 | Hattori | |
| (Continued) | | | | |

FOREIGN PATENT DOCUMENTS

| JP | 61-106904 U | 7/1986 |
| JP | 3-90205 U | 9/1991 |

(Continued)

OTHER PUBLICATIONS

Japanese Office Action dated Dec. 9, 2016 in Patent Application No. 2014-245926 ( with English Translation).
Japanese Office Action dated Jan. 13, 2017 in Patent Application No. 2014-245934 ( with English Translation).
Office Action dated May 8, 2017 in U.S. Appl. No. 15/052,703.
Office Action dated Aug. 1, 2017 in Japanese Patent Application No. 2014-245926 (with English translation).

*Primary Examiner* — Akm Enayet Ullah
(74) *Attorney, Agent, or Firm* — Oblon, McClelland, Maier & Neustadt, L.L.P.

(57) ABSTRACT

On a top face (24*a*) of a base member (3), V-shaped grooves (15*a*) and (23*a*) are provided. On a reverse face (24*b*) of a base member (3), V-shaped grooves (15*b*) and (23*b*) are provided. The V-shaped grooves (15*a*) and (15*b*), which are first V-shaped grooves and are for holding optical fibers, and the V-shaped grooves (23*a*) and (23*b*), which are second V-shaped grooves and are for holding electrode rods (7), are formed facing each other, respectively. The positions of optical fibers and the electrode rods (7) are determined by the V-shaped grooves (15*a*) and (15*b*) and the V-shaped grooves (23*a*) and (23*b*), respectively.

8 Claims, 17 Drawing Sheets

(56) References Cited

U.S. PATENT DOCUMENTS

| | | | |
|---|---|---|---|
| 6,467,973 B2 * | 10/2002 | Takahashi | G02B 6/2551 |
| | | | 385/134 |
| 6,890,109 B2 | 5/2005 | Arima | |
| 6,976,796 B2 | 12/2005 | Koike | |
| 7,848,609 B2 | 12/2010 | Meitzler | |
| 8,254,743 B2 | 8/2012 | Sato | |
| 2007/0053648 A1 * | 3/2007 | Sasaki | G02B 6/3636 |
| | | | 385/137 |
| 2013/0195415 A1 | 8/2013 | Barnes | |
| 2013/0205835 A1 | 8/2013 | Giaretta | |
| 2013/0236145 A1 * | 9/2013 | Sato | G02B 6/2553 |
| | | | 385/96 |
| 2013/0277356 A1 | 10/2013 | Sato | |
| 2014/0131326 A1 | 5/2014 | Sato | |
| 2014/0165657 A1 * | 6/2014 | Sato | G02B 6/2553 |
| | | | 65/485 |

FOREIGN PATENT DOCUMENTS

| | | |
|---|---|---|
| JP | 6-51149 | 2/1994 |
| JP | 07-084141 | 3/1995 |
| JP | 2001-502067 | 2/2001 |
| JP | 2003-014974 | 1/2003 |
| JP | 2004-184543 | 7/2004 |
| JP | 2005-234555 | 9/2005 |
| JP | 2008-116840 | 5/2008 |
| JP | 2010-72245 | 4/2010 |
| JP | 2015-129924 | 7/2015 |
| JP | 2015-129925 | 7/2015 |
| WO | WO 98/12587 A1 | 3/1998 |

\* cited by examiner

BASE MEMBER USED FOR FUSION SPLICER FOR JOINING OPTICAL FIBERS AND FUSION SPLICER

TECHNICAL FIELD OF THE INVENTION

This invention relates to a fusion splicer for joining optical fibers together, and a base member used for the same.

BACKGROUND OF THE INVENTION

Fusion splicers are used for joining optical fibers. In a fusion splicer, optical fibers held in a pair of holders are butted together, placed between electrodes, and joined together by fusing the tips of the optical fibers by arc.

When splicing optical fibers, it is necessary to accurately position the tips of the optical fibers. Thus, optical fibers are usually placed in V-shaped grooves formed on a supporting member for positioning.

As such a fusion splicer, for example, a fusion splicer in which a supporting member that supports optical fibers is integrally formed and fixed to the main body is used (Patent Document 1 for example).

RELATED ART

Patent Documents

[Patent Document 1] Japanese Unexamined Patent Application Publication No. 2004-184543 (JP-A-2004-184543)

SUMMARY OF THE INVENTION

Problems to be Solved by the Invention

In recent years, variety of optical fibers and optical fiber ribbons has been diversified, and optical fibers with various outer diameters and optical fiber ribbons with various pitches have been in use. On a supporting member that supports optical fibers at the time of fusion, V-shaped grooves corresponding to outer diameters and pitches of the optical fibers to be fused are formed. For fusion splicing optical fibers with different outer diameters or pitches, it is necessary to prepare different fusion splicers corresponding to each of the outer diameters or pitches respectively.

Or, if the supporting member is detachable, the supporting member for every outer diameter or number of core wire of the optical fibers is required. Thus, it has been necessary to prepare many supporting members.

In addition, if the V-groove of a supporting member gets dust, the V-groove needs to be cleaned at the site, which impairs workability and wastes time. If spare supporting members are to be prepared for each type of optical fibers to solve this problem, it would be necessary to prepare even more supporting members.

The present invention was achieved in view of such problems. Its object is to provide a base member, which has an excellent workability and is applicable for fusing optical fibers of various types together, and a fusion splicer including the same.

Means for Solving Problems

To achieve the above object, the first invention is a base member used in a fusion splicer that joins optical fibers together. The base member includes a first V-groove that holds optical fibers, and the first V-shaped groove is formed on each face of the base member.

The first V-shaped groove formed on one face of the base member may be in a different form from the first V-shaped groove formed on another face of the base member.

The first V-shaped groove on one face of the base member may be for single-core optical fibers and the first V-shaped groove on another face of the base member may be for multi-core optical fibers.

The first V-shaped grooves on both faces of the base member may be both for multi-core optical fibers, and a pitch of the first V-shaped groove on one face of the base member may be different from a pitch of the first V-shaped groove on another face of the base member.

A depth of the first V-shaped groove on one face of the base member may be different from a depth of the first V-shaped groove on another face of the base member.

The base member may further include a second V-shaped groove that holds electrode rods. The second V-shaped groove is formed in the longitudinal direction of the base member, which is a direction that intersects with the first V-shaped groove approximately at right angles, and the second V-shaped grooves may be formed on both faces of the base member.

A length of at least one face of the base member in a longitudinal direction of the base member may be different from a length of another face of the base member, and an edge position of the second V-shaped groove formed on one face of the base member may be at a different place of an edge position of the second V-shaped groove formed on another face of the base member.

In a width direction of the base member that intersects with a longitudinal direction of the base member at right angles, the position of the second V-shaped groove formed on one face of the base member may be at a different place of the position of the second V-shaped groove formed on another face of the base member.

A second invention is a fusion splicer including the base member according to the first invention and a base-holding member that holds the base member. The base member can be attached to and detached from the base-holding member. The base-holding member includes a horizontal positioning reference part, which determines the position of the base member on the base-holding member in a direction parallel to an optical fiber installation surface of the base member, and a vertical positioning reference part, which determines the position of the base member on the base-holding member in a direction vertical to the optical fiber installation surface of the base member. The base member contacts with the vertical positioning reference part at parts other than the first V-shaped grooves.

Effects of the Invention

The present invention can provide a base member, which has an excellent workability and is applicable for fusing optical fibers of various types together, and a fusion splicer including the same.

BRIEF DESCRIPTION OF DRAWINGS

FIG. 3 is an exploded perspective view showing the base member 3, base-holding member 5, and the like.

FIG. 12A is a drawing showing the top and reverse faces of a base member 3a.

FIG. 12B is an enlarged view showing shapes of V-grooves 15a and 15b on the top and reverse faces of the base member 3a.

DESCRIPTION OF SOME EMBODIMENTS

Figure 1:
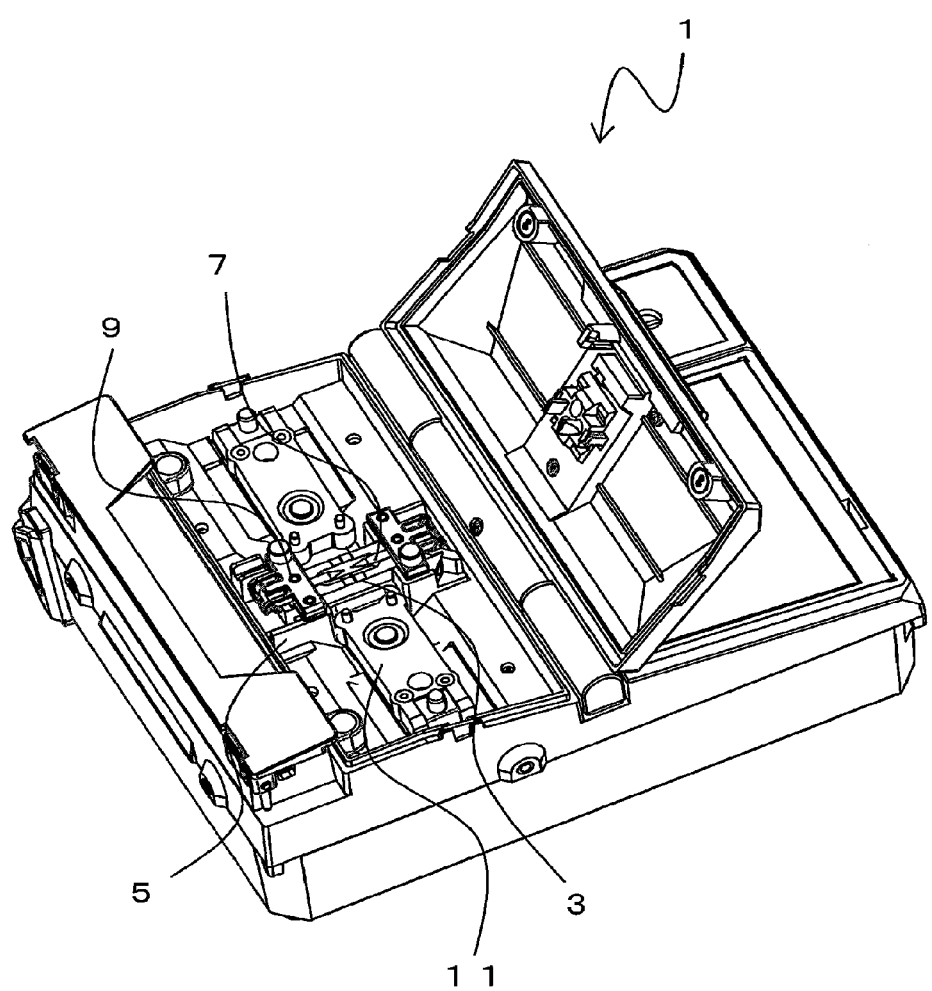
FIG. 1 is a perspective view showing a fusion splicer 1.

Hereinafter, embodiments of the present invention will be described with reference to the accompanying drawings. FIG. 1 is a perspective view showing a fusion splicer 1. The fusion splicer 1 includes a holder-mounting part 11 on which a holder that holds optical fibers is mounted, a base member 3 on which tips of optical fibers and electrodes are disposed, a base-holding member 5 that holds the base member 3, and electrode-holding members 9 that hold electrode rods 7.

The fusion splicer 1 joins a pair of optical fibers together by fusion. A pair of holders, which are omitted in the drawing, holds optical fibers and the holders are mounted on the holder-mounting part 11. With the tips of the optical fibers butted to each other, an electric arc is generated between a pair of electrode rods 7 to melt and join the tips of the optical fibers.

Figure 2:
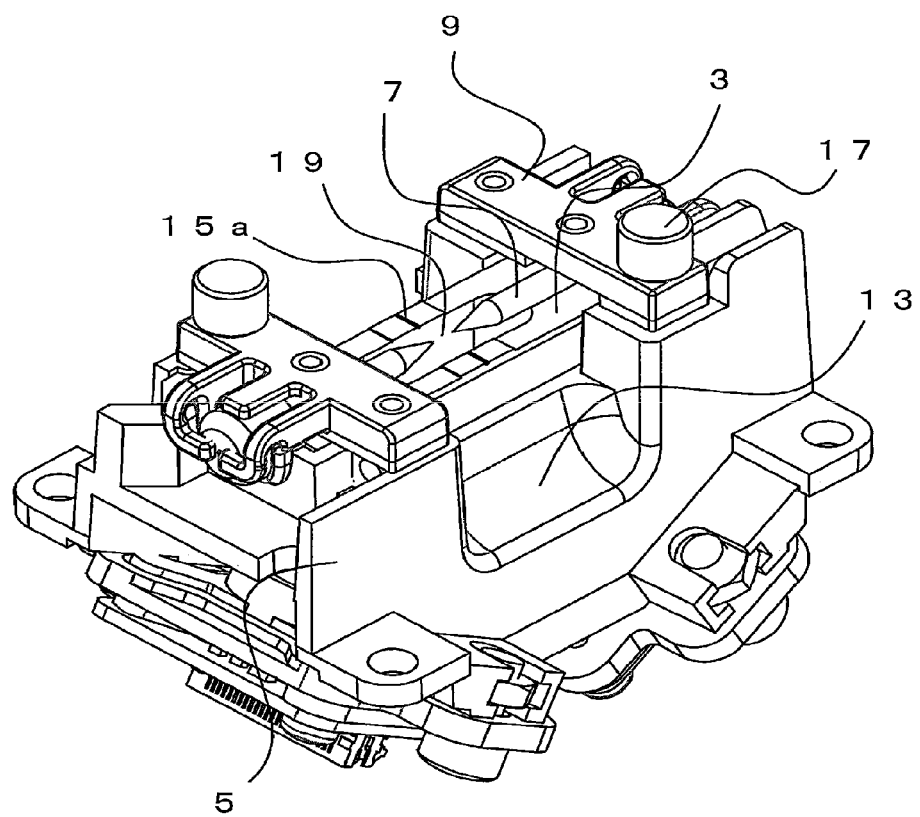
FIG. 2 is a perspective view showing a base-holding member 5 holding a base member 3.
Figure 3:
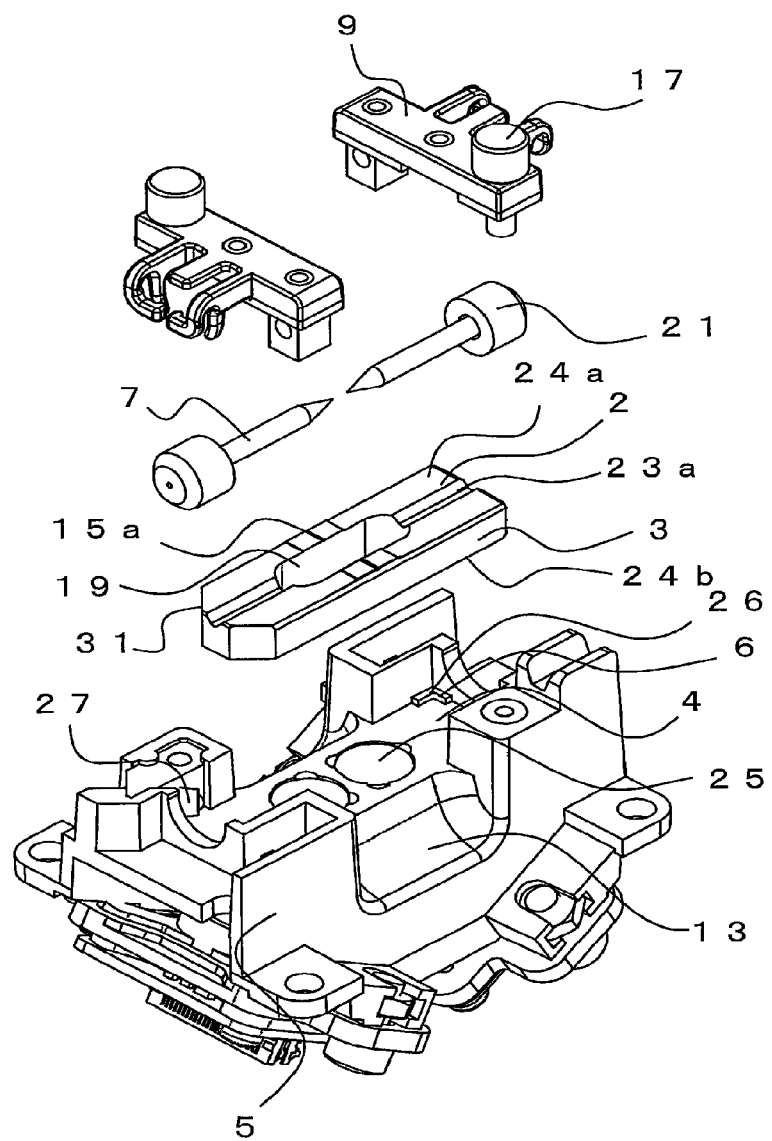
Figure 4:
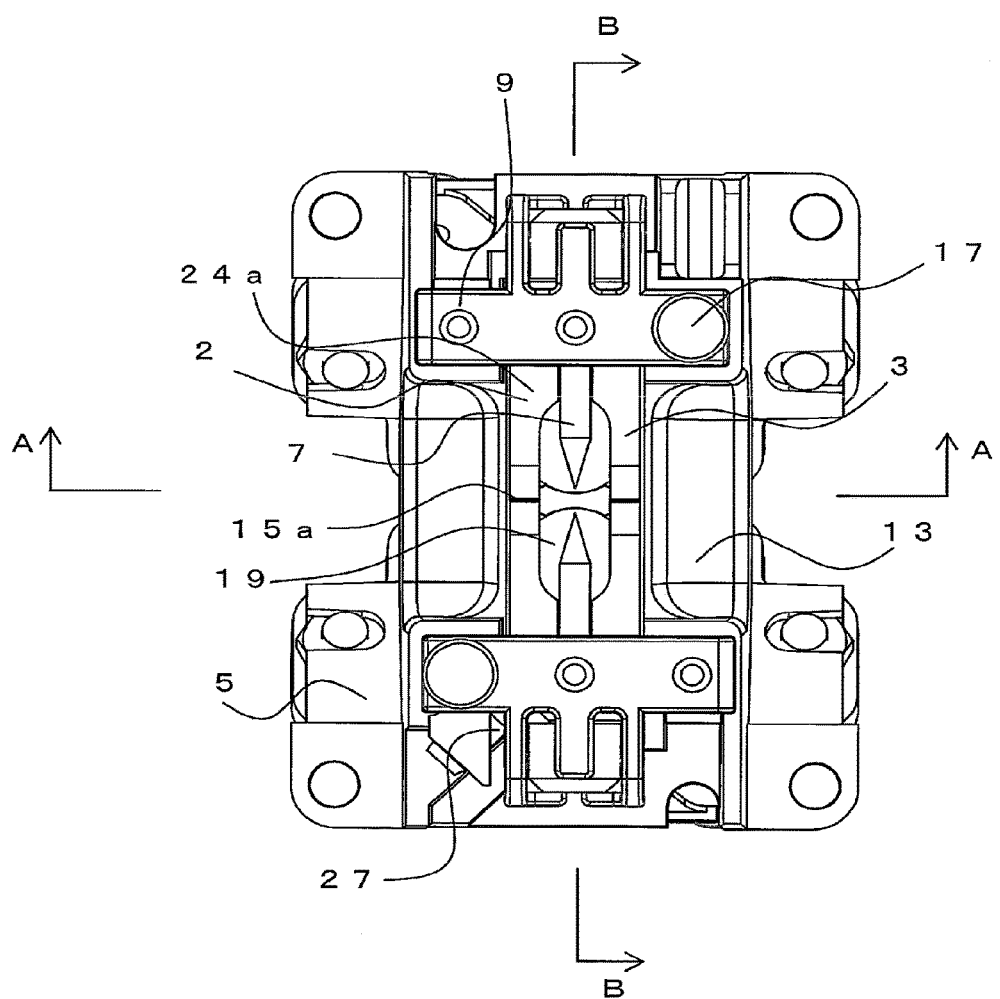
FIG. 4 is a plan view showing the base-holding member 5 holding the base member 3.
Figure 5:
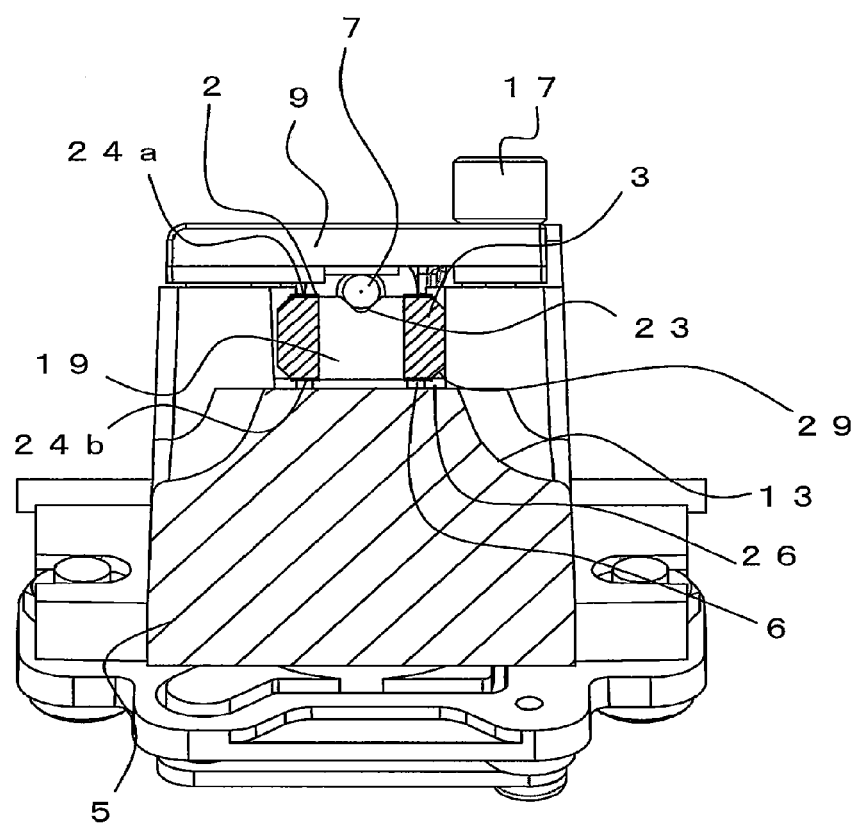
FIG. 5 is a cross sectional view taken along the line A-A of FIG. 4.

FIG. 2 is a perspective view showing the base-holding member 5 and FIG. 3 is an exploded perspective view showing the base-holding member 5, the base member 3, and the like. Also, FIG. 4 is a plan view of the base-holding member 5 and the like, FIG. 5 is a cross sectional view taken along A-A line of FIG. 4, and FIG. 6 (a) is a cross sectional view of taken along B-B line of FIG. 4. The base-holding member 5 holds the base member 3.

The base member 3 is detachable from the base-holding member 5 without using, for example, tools or the like. That is, while the base-holding member 5 is fixed to the main body of the fusion splicer, the base member 3 is detachably fixed to the base-holding member 5. The base-holding member 5 has a positioning mechanism that determines the position of the base member 3 on the base-holding member 5.

Here, a reference part that determines the position of the base member 3 on the base-holding member 5 in a direction parallel to an optical fiber installation surface 2, which is an upper surface of the base member 3, is called a horizontal positioning reference part. Also, a reference part that determines the position of the base member 3 on the base-holding member in a direction vertical to the optical fiber installation surface 2 (the direction vertical to the horizontal positioning reference part), which is the upper surface of the base member 3, is called a vertical positioning reference part 6. That is, the horizontal positioning reference part and the vertical positioning reference part 6 are provided on the base-holding member 5. A method for fixing the base member 3 to the base-holding member 5 and its positioning mechanism (the horizontal positioning reference part) will be described in detail later.

Figure 7:
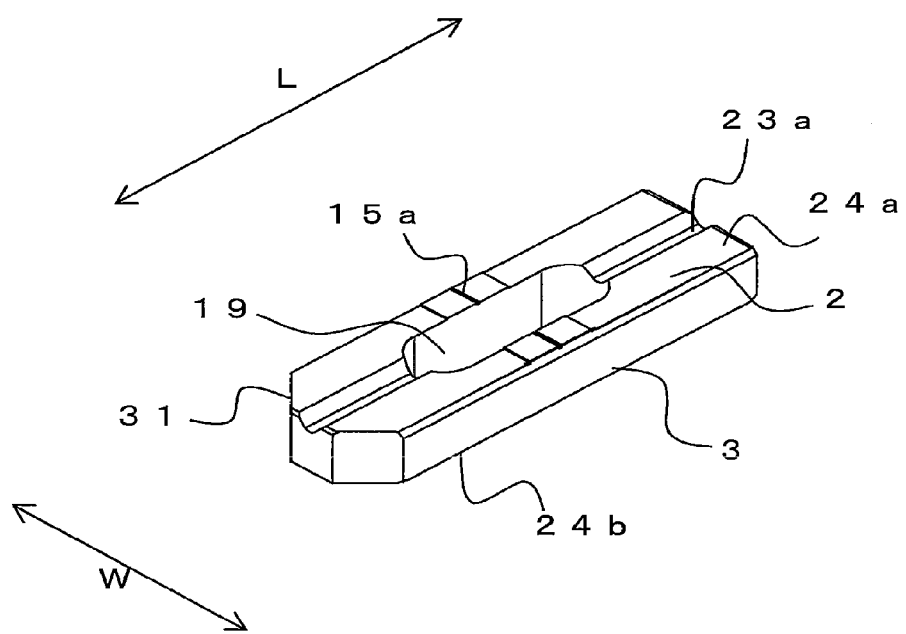
FIG. 7 is a perspective view showing the base member 3.
Figure 8:
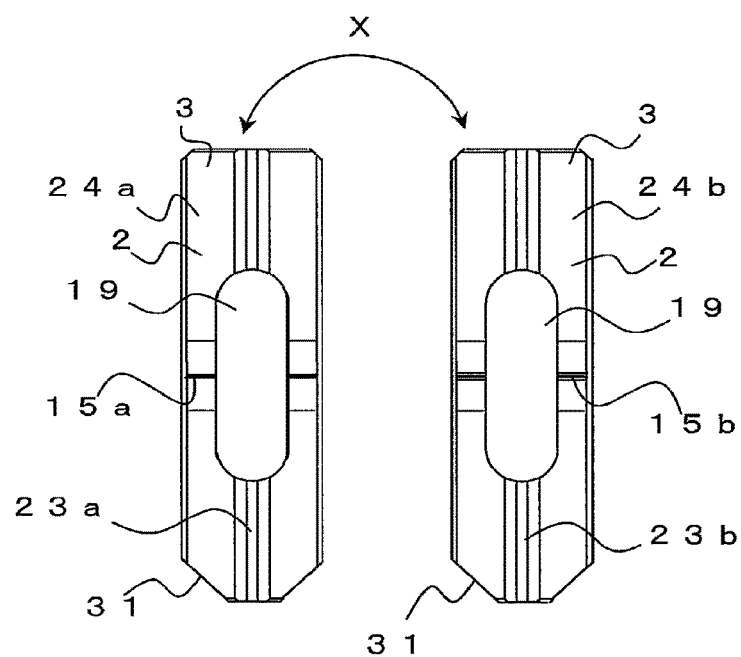
FIG. 8A is a drawing showing a top face and a reverse face of the base member 3.
FIG. 8B is an enlarged view showing shapes of V-grooves 15a and 15b on the top and reverse faces of the base member 3.
Figure 8:
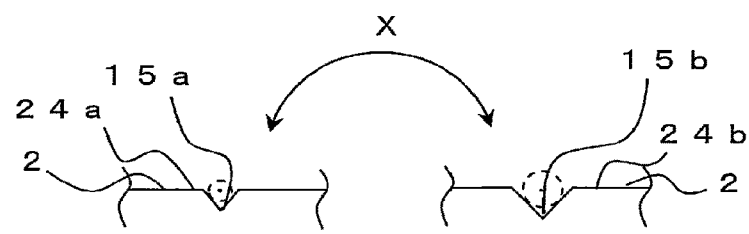

The base member 3 is, for example, an integrated member that holds optical fibers and electrode rods. FIG. 7 is a perspective view of the base member 3 used in the fusion splicer 1, and drawings in FIG. 8A show a top face 24a and a reverse face 24b respectively when the base member 3 is turned over (X in the drawing).

Here, a direction in which V-shaped grooves 23a and 23b are formed is a longitudinal direction of the base member 3 (L in the drawing), and a direction in which V-shaped grooves 15a and 15b are formed, which is orthogonal to the longitudinal direction, is a width direction of the base member 3 (W in the drawing).

The base member 3 is substantially a rectangular parallelepiped provided with a cutout portion 31 at a part thereof. The cutout portion 31 is provided, for example, between two side faces that intersect with each other and is made by cutting the part at an angle of 45° to the two side faces so that the shape of the cross sections is rectangular. The cutout portions 31 are provided at corner parts that are adjacent in the width direction of the base member 3.

The V-shaped groove 15a and V-shaped groove 23a are provided on the top face 24a of the base member 3. The V-shaped groove 15b and V-shaped groove 23b are provided on the reverse face 24b of the base member 3. That is, on each face of the base member 3, the V-shaped grooves 15a and 23a and the V-shaped grooves 15b and 23b are formed, respectively. The V-shaped grooves 15a and 15b, which are first V-shaped grooves to hold optical fibers, and the V-shaped grooves 23a and 23b, which are second V-shaped grooves to hold electrode rods 7, are formed in directions intersecting with each other substantially at right angles. Optical fibers and the electrode rods 7 are positioned by the V-shaped grooves 15a and 15b and by the V-shaped grooves 23a and 23b, respectively.

A bore 19 is formed at an approximate center of the base member 3. The V-shaped grooves 15a and 15b are formed on a same straight line facing each other with the bore 19 in between. Similarly, the V-shaped grooves 23a and 23b are formed on a same straight line facing each other with the bore 19 in between.

When the base member 3 like above is used, alignment of optical fibers may be performed only in one direction that is parallel to the direction of the central axis of the optical fibers. For example, a holder to which the optical fibers are fixed may be mounted on the holder-mounting part 11, and alignment can be done by moving the holder-mounting part 11 in only one direction that is parallel to the axis direction of the optical fibers.

The V-shaped groove 15a on the top face 24a and the V-shaped groove 15b on the reverse face 24b may be in an exactly the same form (depths and the like), or the V-shaped groove 15a and 15b may have different forms. FIG. 8B is an enlarged view showing the forms of the V-shaped grooves 15a and 15b, respectively.

As shown in the drawing, the depths of the V-shaped grooves 15a and 15b differ. Thus, the base member 3 can be applied to optical fibers having different outer diameters using suitable V-shaped grooves by making use of both the top and the reverse faces. For example, the top face 24a corresponds to an optical fiber with an outer diameter of 80 μm and the reverse face 24b corresponds to an optical fiber with an outer diameter of 125 μm. That is, V-shaped groove 15a and 15b and V-shaped groove 24a and 24b are formed in such a manner that the position of the axial center of the optical fibers, the positions of the electrode rods 7, and the positions of the cameras are all in appropriate places on each of the faces when each of the optical fibers are disposed in the V-shaped groove 15a and the V-shaped groove 15b respectively.

The base member 3 is fixed by being pressed against the base-holding member 5 from above. For example, the base member 3 is pressed against the base-holding member 5 from above by the electrode-holding members 9 via the electrode rods 7 and fixed with screws 17 that can be screwed by hand. That is, the electrode rods 7 held by the electrode-holding members 9 are disposed on the V-shaped groove 23a of the base member 3, and the electrode-holding members 9 are fixed to the base-holding member 5 by the screws 17. At this time, the electrode-holding members 9 and the base-holding member 5 interpose the base member 3 and the electrode rods 7, and the electrode rods 7 press the base member 3 from above. In this state, electrodes formed on the electrode-holding members 9 (omitted in the drawings) contact the electrode rods 7 and are electrically connected with the electrode rods 7. Thus, the electrode rods 7 can carry electrical current.

When the base member 3 is fixed to the base-holding member 5, a front face of an electrode head 21 is in contact with a side face of the base member 3 as shown in FIG. G. Thus, the position of the tip of the electrode rod 7 on the base member 3 is determined.

A pair of cameras 25 are provided at a part of the base-holding member 5 on which the base member 3 is installed. The cameras 25 are formed at a part corresponding to the bore 19 when the base member 3 is installed. The cameras 25 can take images of tip parts of the optical fibers installed on the base member 3 through the bore 19. Thus, the operator can check the positions of the tip parts of the optical fibers and the like using the cameras 25.

As shown in FIG. 5, recess portions 13 are provided on both side parts of the installation surface of the base member 3 on the base-holding member 5. The recess portions 13 are parts that are cut out downward from the installation surface of the base member 3. By providing the recess portions 13, fingers can be inserted into the recess portions 13 so that the fingers do not interfere with the base-holding member 5 when attaching/detaching the base member 3 from above, which facilitates the attaching/detaching operation of the base member 3.

Figure 6:
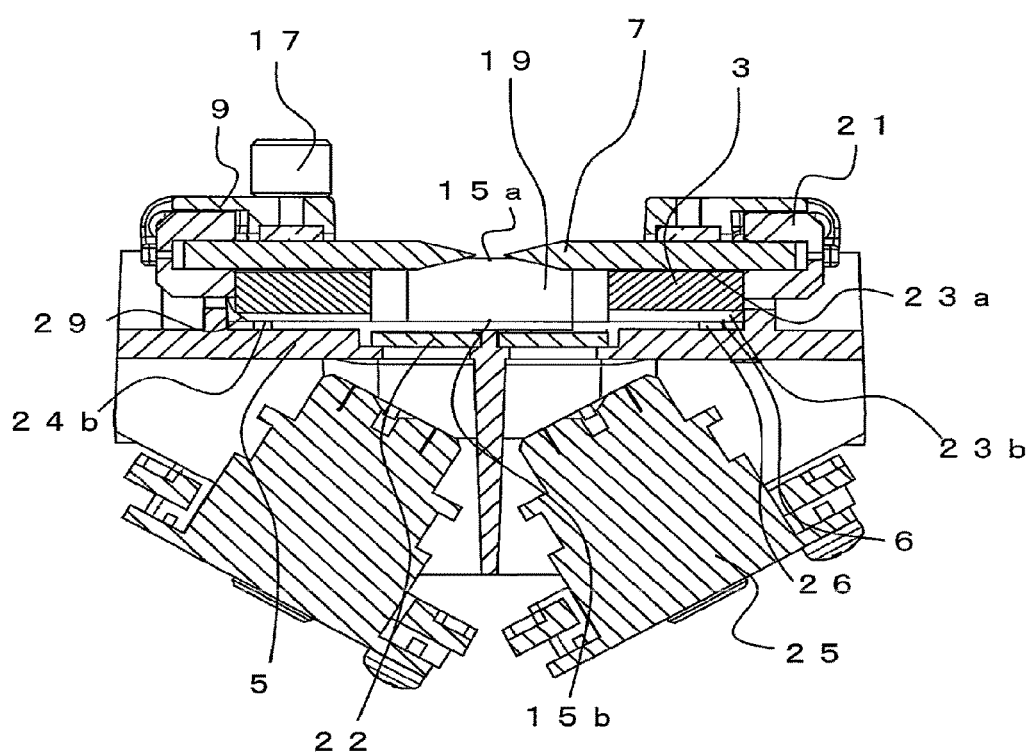
FIG. 6 is a cross sectional view taken along the line B-B of FIG. 4.

As shown in FIG. 3, FIG. 5, and FIG. 6, a base-member installation part 26 is provided on the installation surface on which the base member 3 is installed. Here, the part of the base-holding member 5 in which the base member 3 is installed is called a base-member container 4 (see FIG. 3). A part of the bottom surface of the base member 3 contacts with an upper surface of the base-member installation part 26 and the position in the vertical direction is determined. Thus, at least a part of the vertical positioning reference part 6 is the upper surface of the base-member installation part 26.

Although the example shown in the drawing shows that the base-member installation part 26 protrudes from the bottom surface of the base-member container 4, the base-member installation part 26 may be fixed onto the side walls of the base-member container 4, without providing the bottom surface of the base-member container 4. Also, the base-member installation part 26 is preferably provided at a position that does not correspond to the positions of the V-shaped grooves on the back of the base member 3 when the base member 3 is installed. This can prevent the V-shaped grooves from attaching dust and the like. For example, in the example shown in the drawing, the base-member installation parts 26 is formed around each of the four corners of the base-member container 4, although the forming position of the base-member installation part 26 is not limited thereto.

Also, although a cover plate 22 made of glass is provided on the bore of the bottom surface of the base-member container 4 in the example shown in the drawing, the cameras 25 may be exposed without providing the cover plate 22.

Chamfered portions 29 are formed at edge parts of the top and reverse faces of the base member 3. The chamfered portions 29 are preferably 0.5 min or more C-chamfered, for example. In this way, the chamfered portions 29 can keep away the foreign substances which are likely to accumulate at the corners of the base-member installation part 26. Thus, position shifting or the like of the base member 3 can be suppressed.

The electrode head 21 is provided at one end of the electrode rod 7. The end opposite to the electrode head 21 of the electrode rod 7 is an electrode portion. The electrode head 21 is an insulating portion having a larger diameter than the electrode rod 7 and held by the electrode-holding member 9. That is, the electrode rod 7 is held by the electrode-holding member 9.

The holding mechanism for the electrode rod 7 (the electrode head 21) by the electrode-holding member 9 is not particularly specified as long as holding the electrode rod 7 (the electrode head 21) is possible. However, electrode-holding member 9a shown in FIG. 9A and FIG. 9B can also be used.

Figure 9:
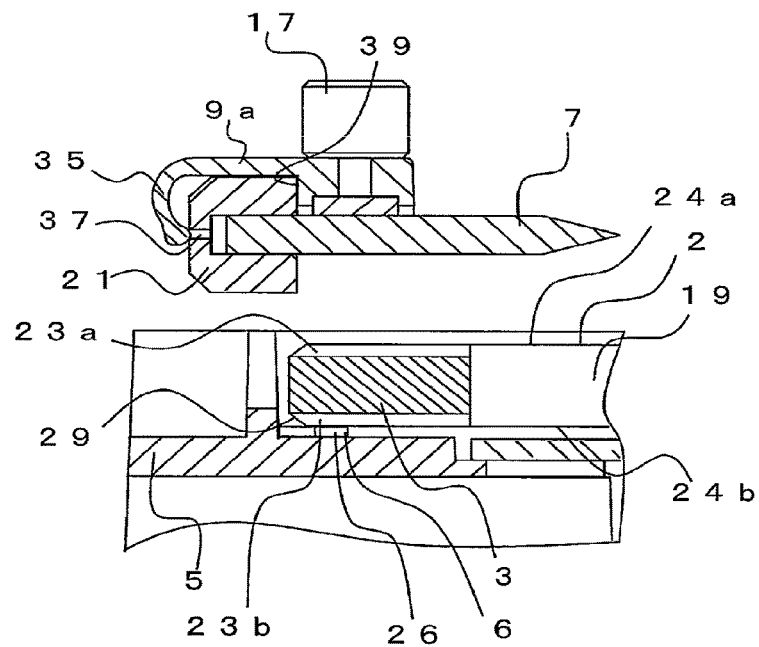
FIG. 9A is a cross sectional view showing a state in which an electrode-holding member 9a holds an electrode rod 7.
FIG. 9B is a cross sectional view showing a state in which the electrode-holding member 9a is fixed to the base-holding member 5.
Figure 9:
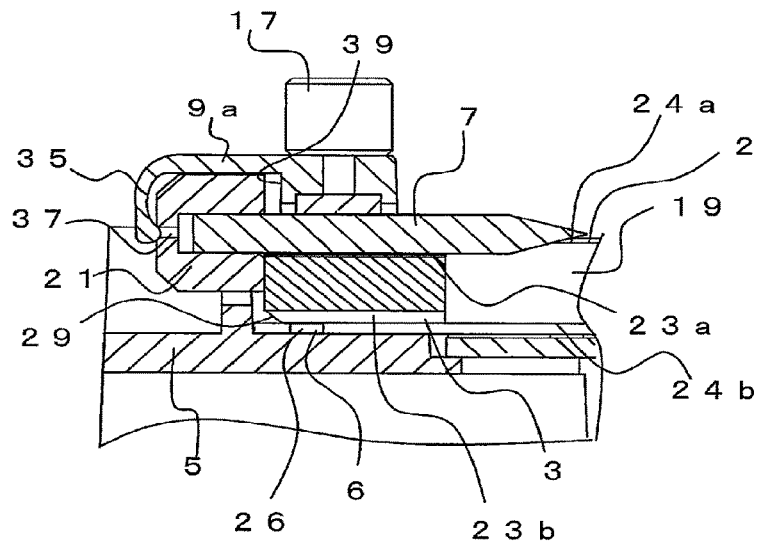

As shown in FIG. 9A, the electrode-holding member 9a has an elastic portion 35 that presses the electrode head 21 from behind. On a part opposite to the elastic portion 35, provided is a wall portion 39 to which a front face of the electrode head 21 is pressed by the elastic portion 35. Since the elastic portion 35 easily deforms elastically in a direction moving away from the wall portion 39, the electrode head 21 can be interposed and held between the elastic portion 35 and the wall portion. That is, when the electrode rod 7 is disposed on the base member 3, the front face of the electrode head 21 is in contact with the wall portion 39 and the rear face of the electrode head 21 is in contact with the elastic portion 35. Thus, the electrode rod 7 is fixed being pressed against the base member 3 by the elastic portion 35.

On this occasion, a bore 37 is provided at the center of the electrode head 21. Also, a protrusion is formed on the inner face of the tip of the elastic portion 35. Thus, the center position of the electrode head 21 can be determined by placing the protrusion into the bore 37.

When the electrode rod 7 is disposed on the base member 3, the front face of the electrode head 21 contacts the side face of the base member 3. At this time, the elastic portion 35 is slightly pushed back by the electrode head 21. For this reason, a clearance is created between the electrode head 21 and the wall portion 39.

Thus, by matching the front face position of the electrode head 21 with the side face position of the base member 3, the tip position of the electrode rod 7 in its longitudinal direction to the base member 3 can be determined. The tip position of the electrode rod 7 in the horizontal direction is determined by the V-shaped groove 23*a*.

As described above, the electrode-holding member 9*a* is fixed to the base-holding member 5 by the screw 17. At this time, an electrode of the electrode-holding member 9*a* is pressed against the electrode rod 7 to be electrically connected. Also, the electrode rod 7 is pressed against the base member 3 (the V-shaped grooves 23*a* and 23*b*) by the electrode-holding member 9*a*. Thus, the base member 3 is pressed against the base-holding member 5. Thus, the electrode rod 7 can be fixed.

Figure 10A:
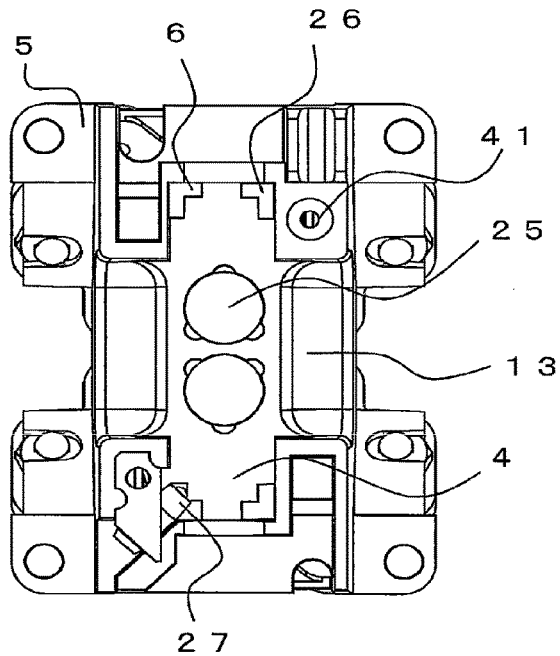
FIG. 10A is a plan view showing the base-holding member 5.

Next, positioning method of the base member 3 in the horizontal direction will be described. FIG. 10A is a plan view of the base-holding member 5 before installing the base member 3. As mentioned above, the cameras 25 are disposed under the installation part for the base member 3 on the base-holding member 5. Also, the recess portions 13 are formed on both side parts that face each other. Also, the base-member installation parts 26 are formed around the four corners of the base-member container 4. In addition, a female screw 41 to which the screw 17 of the electrode-holding member 9 (9*a*) is to be fixed is formed.

The base-member container 4 on which the base member 3 is to be installed has wall portions surrounding at least a part of the base member 3 (at least in two directions). The size of the base-member container 4 surrounded by the wall portions is set to be slightly larger than the size of the base member 3. A pressing member 27 is fixed to a part of the base-member container 4 surrounded by the wall portions. The pressing member 27 is, for example, a plunger provided with an elastic member inside.

Figure 10B:
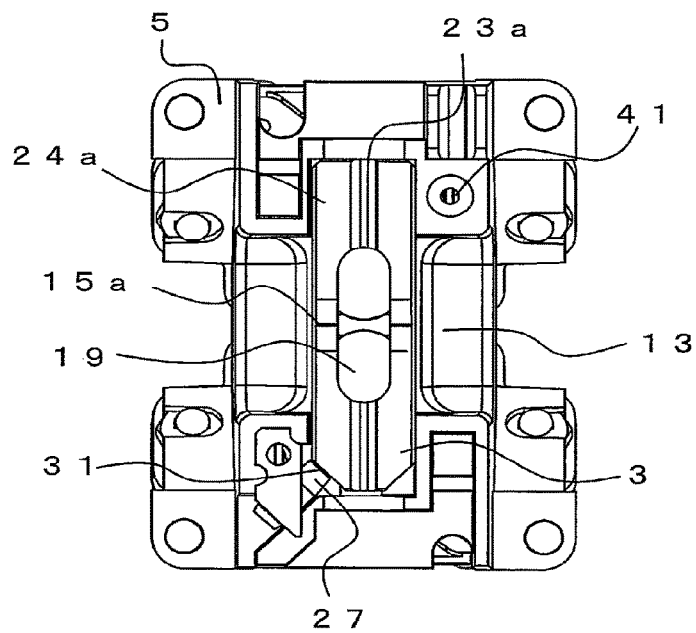
FIG. 10B is a plan view showing a state in which the base member 3 is disposed on the base-holding member 5.

As shown in FIG. 10B, when the base member 3 is disposed on the base-holding member 5, the pressing member 27 is located at the part corresponding to the cutout portion 31. At this time, the pressing member 27 presses the base member 3 in a direction approximately vertical to the face of the cutout portion 31, for example. That is, the pressing member 27 can press the base member 3 in the direction that is parallel to the optical fiber installation surface 2. The cutout portions 31 are formed on both sides of the base member 3 in the width direction. Thus, the pressing member 27 can still press the base member 3 in the direction approximately vertical to the face of the cutout portion 31 when the base member 3 is used with the front and the reverse faces being turned over.

Figure 11A:
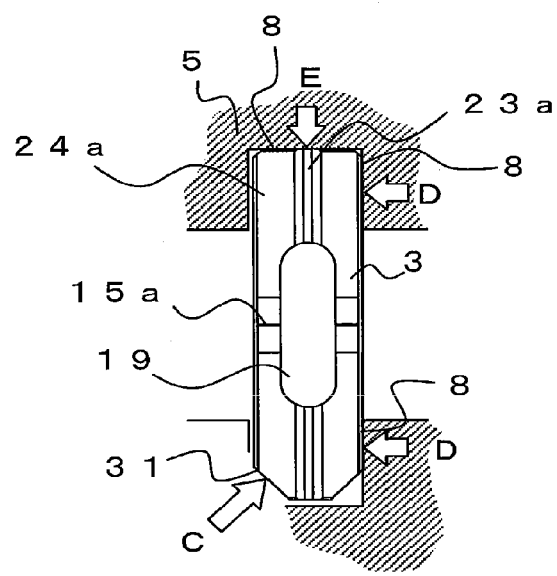
FIG. 11A shows a positioning state of the base member 3.

FIG. 11A is a schematic view showing a positioning status in this case. When the pressing member 27 (which is omitted in the drawings and the same applies hereafter) presses the cutout portion 31 (C in the drawing), the base member 3 is pushed against opposing inner faces of the wall portions of the base-member container 4. As mentioned above, since the pressing member 27 presses the cutout portion 31 in the direction of the cutout face, the base member 3 is pressed in a direction that is oblique to both the long side and the short side of the base member 3. Thus, outer surfaces of the base member 3 are in contact with two inner faces (in two directions) of the base-member container 4 by being pressed against the same. The outer surfaces of the base member 3 and the inner faces of the base-holding member 5 that are in contact with each other are plane surfaces, for example.

As above, the base member 3 is pressed by an inner surface (D in the drawing) while being pressed by the other inner surface (E in the drawing). That is, the base member 3 is pressed from at least two different directions, other than the pressing part pressed with the pressing member 27.

In this case, the inner surfaces of the wall portions of the base-holding member 5 function as a horizontal positioning reference part 8. Thus, the pressing member 27 can press the base member 3 against the horizontal positioning reference part 8, which is at least in two different directions that are parallel to the optical fiber installation surface 2. That is, the outer surfaces of the base member 3 are in surface contact with the inner surfaces of the base-holding member 5, which function as the horizontal positioning reference part 8, so that the position of the base member 3 can be determined at at least two places by being pressed with the pressing member 27.

As above, at, least, a part of the horizontal positioning reference part 8 can be the inner surfaces of the base-member container 4 formed on the base-holding member 5. That is, if the inner surfaces of the base-member container 4 and the outer side surfaces of the base member 3 are plane surfaces, at least a part of the horizontal positioning reference part 8 is the contacting surfaces of the inner surfaces of the base-member container 4 and the outer side surfaces of the base member 3. In this case, since the base member 3 is disposed with at least three reference positions including the pressing part pressed with the pressing member 27, the base member 3 is positioned in the horizontal direction (the direction parallel to the optical fiber installation surface 2 (the surface on which V-shaped grooves 15*a* and the like are formed) of the base member 3) with certainty.

The position of the base member 3 in the height (vertical) direction is determined by being pressed against the upper surface (the base-member installation part 26) of the base-holding member 5 (the base-member container 4) by the electrode-holding member 9 or 9*a* as described above. Thus, the base member 3 can be installed in an accurate position with certainty even after the base member 3 is once detached and then inserted again.

Figure 11B:
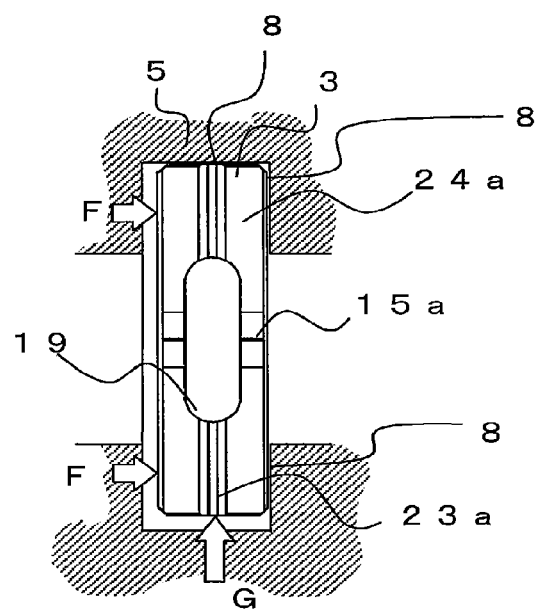
FIG. 11B shows a positioning state of the base member 3.

Instead of pressing the base member 3 in an oblique direction with the pressing member 27, a plurality of the pressing members 27 may be used and each of the pressing members 27 may press the base member 3 in different, directions. For example, as shown in FIG. 11B, the short side of the base member 3 may be pressed with a pressing member (G in the drawing), and the long side of the base member 3 may also be pressed with a pressing member (F in the drawing) to press the base member 3 against the opposite walls of the base-member container 4 (the horizontal positioning reference part 8) for positioning in the horizontal direction. In this case, the cutout portion 31 is unnecessary.

Also, the present invention is not limited to the case in which the base member 3 and the horizontal positioning reference part 8 are in surface contact. For example, protrusion portions may be formed at a plurality of locations on the inner surfaces of the base-holding member 5. Furthermore, fitting a pin and a hole may be used as a positioning mechanism of the base member 3, or the position may be determined by setting the size of the base member 3 and the base-member container 4 approximately the same and pushing the base member 3 into the base-member container 4.

As above, according to the present embodiment, since the base member 3 and the base-holding member 5 are separated bodies, attaching/detaching the base member 3 is easy. For this reason, changing of the base member 3 is easy. In addition, since the V-shaped grooves 15a and 15b are formed on each faces of the base member 3 respectively, the base member 3 can be turned over to make use of the V-shaped grooves 15a and 15b on each of the faces.

In addition, since the V-shaped grooves 23a and 23b that hold the electrode rods 7 are formed on each faces of the base member 3 respectively, the base member 3 can hold both the electrode rods 7 and optical fibers.

At this time, when the V-shaped grooves 15a and 15b are in the same form and dust or the like is attached to the V-shaped groove on one side, the base member 3 can be turned over to use the clean V-shaped grooves on the other side, without cleaning the V-shaped groove on the site. Thus, the workability is excellent and it is unnecessary to prepare the extra spare base member 3.

In addition, by changing the forms of the V-shaped grooves 15a and 15b, a variety of optical fibers can be spliced by using just one piece of the base member 3.

For example, by setting the depth of the V-shaped groove 15a on one side of the base member different from the depth of the V-shaped groove 15b on the other side of the base member 3, one piece of the base member 3 can correspond to a plurality of types of optical fibers with different outer diameters. Thus, splicing of a variety of optical fibers is possible.

Also, the base member 3 is positioned by being pressed with the pressing member 27 against the horizontal positioning reference part 8 of the base-holding member 5. Thus, when attaching the base member 3, position shifting of the base member 3 in the direction parallel to the optical fiber installation surface 2 can be prevented. In this way, the horizontal positioning reference part 8 facilitates the positioning of the base member 3 to the base-holding member 5, so that the positioning of the base member 3 when re-installed to the base-holding member 5 after detaching and changing the base member 3 is easy.

Also, with the position in the direction parallel to the optical fiber installation surface 2 being determined as above, pressing the base member 3 from above against the vertical positioning reference part 6 (the base-member installation part 26) by the electrode-holding members 9 or 9a, which can conduct electrical current to the electrode rods 7, can determine the position of the base member 3 in the height direction (vertical position) so that the position of the base member 3 can be fixed.

Also, the position of the base-member installation part 26 does not correspond to the positions of the V-shaped grooves on the backside of the base member 3. For this reason, foreign substances or the like on the base-member installation part 26 would not be pushed into the V-shaped grooves. That is, since the horizontal positioning reference part 6 is not in contact with the V-shaped groove 15b on the reverse face of the base member 3, foreign substances or the like that are attached to the horizontal positioning reference part 6 are not pushed into the V-shaped groove 15b.

Also, before disposing the electrode 7 on the base member 3, the electrode-holding member 9a can hold the electrode rod 7 with certainty by interposing the electrode head 21 between the wall portion 39 and the elastic portion 35. Also, when the electrode rod 7 is disposed on the base member 3, the front face of the electrode head 21 moves away from the wall portion 39 to be in contact with the end part of the base member 3. Thus, the tip of the electrode rod 7 can be positioned to the base member 3 in its longitudinal direction.

Also, providing the recess portions 13 on both side parts of the part of the base-holding member 5 that holds the base member 3 can suppress the interference between fingers and the base-holding member 5 when picking up the base member 3 by fingers. For this reason, the base member 3 can be easily picked up by fingers. Thus, attaching/detaching operation of the base member 3 is easy.

Second Embodiment

Figure 12A:
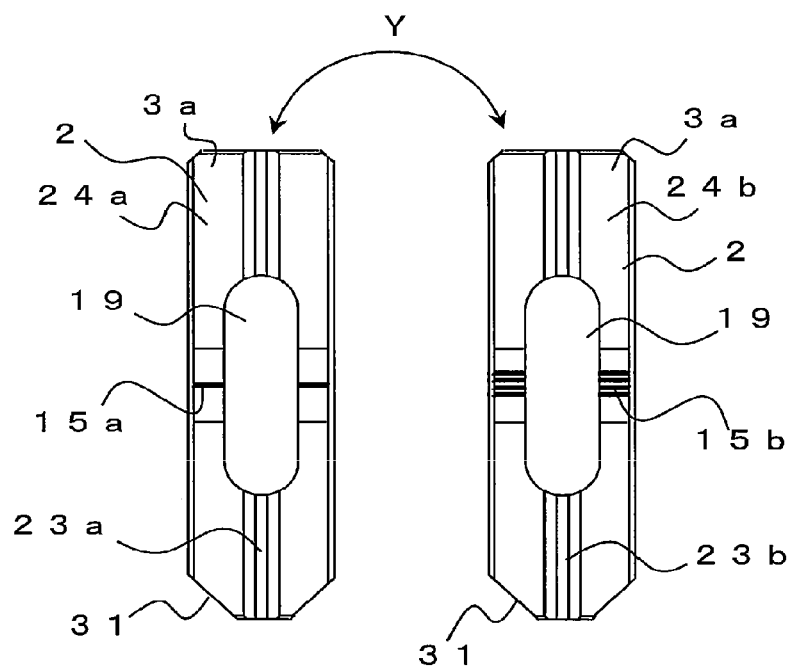
Figure 12B:
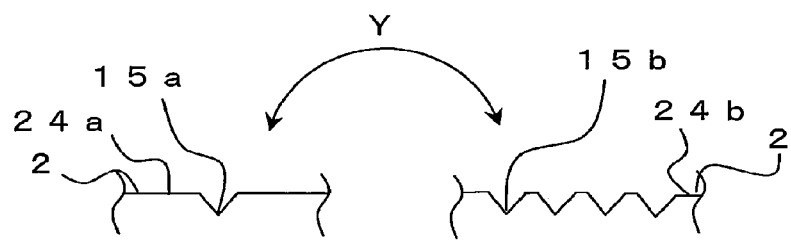

Next, another embodiment of a base member will be described. Although the above-mentioned base member 3 is an example having V-shaped grooves 15a and 15b that are both for single-core optical fibers, the present invention is not limited thereto. FIG. 12A is a drawing showing the top face 24a and the reverse face 24b when a base member 3a is turned over (Y in the drawing), and FIG. 12B is an enlarged view of the V-shaped grooves 15a and 15b on the top and the reverse faces.

The base member 3a has almost the same structure as the base member 3 except that the V-shaped grooves 15b on the reverse face 24b are for multi-core optical fibers. That is, a plurality of the V-shaped grooves 15b are formed side-by-side on a plurality of straight lines that are parallel to each other, facing each other with the bore 19 in between.

By making use of the above base member 3a, which has the V-shaped groove 15a for single-core optical fibers on one side and the V-shaped grooves 15b for multi-core optical fibers on the other side, one piece of the base member 3a can be applied not only to single-core optical fibers, but also to optical fiber ribbons in which a plurality of optical fibers are aligned side-by-side and joined together.

There have been cases in which one of a plurality of V-shaped grooves for multi-core optical fibers is used for fusion splicing single-core optical fibers. In such cases, the V-shaped groove that is located at the approximate center is used. However, when the number of cores of the multi-core optical fibers is large, there have been operational errors such as that the optical fibers are placed in different V-shaped grooves on the right and left sides.

However, with the present embodiment, the V-shaped groove for single-core can be used for splicing single-core optical fibers and the V-shaped groove for multi-core can be used for splicing multi-core optical fibers just by turning the base member 3 over, changing from the top face to the reverse face or vice versa. This can shorten the operation time and prevent operational errors.

Third Embodiment

Figure 13A:
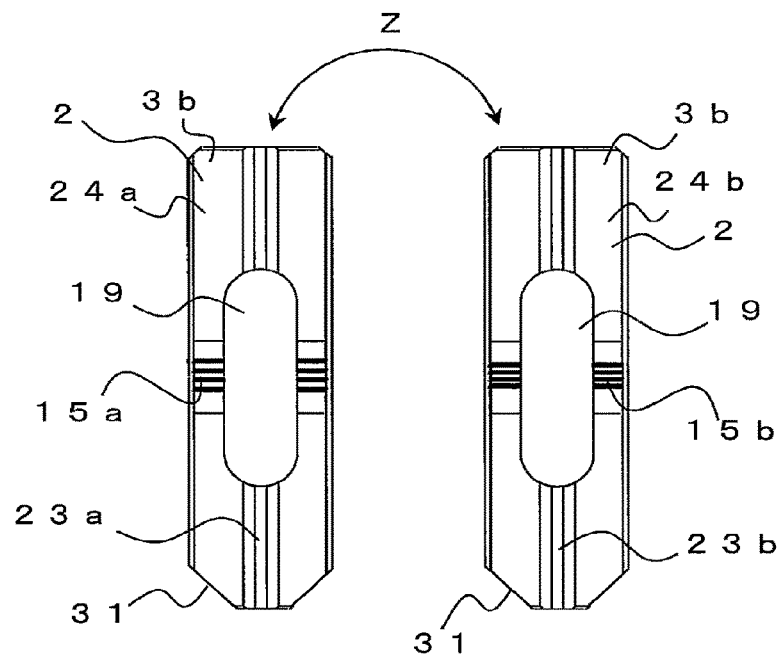
FIG. 13A is a drawing showing the top and reverse faces of a base member 3b.
Figure 13B:
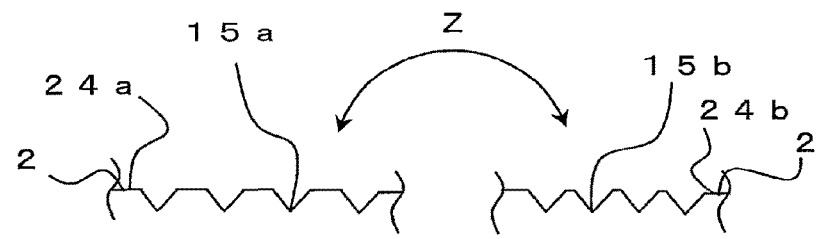
FIG. 13B is an enlarged view showing shapes of V-grooves 15a and 15b on the top and reverse faces of the base member 3b.

FIG. 13A is a drawing showing the top face 24a and the reverse face 24b when a base member 3b is turned over (Z in the drawing). FIG. 13B is an enlarged view of the V-shaped grooves 15a and 15b on the top and the reverse faces.

The base member 3b has almost the same structure as the base member 3 except that both the V-shaped grooves 15a on the top face 24a and the V-shaped grooves 15b on the reverse face 24b are for multi-core optical fibers. That is, a plurality of the V-shaped grooves 15a and 15b are formed side-by-side on a plurality of straight lines that are parallel to each other, facing each other with the bore 19 in between.

The pitch of the V-shaped grooves 15a on one side of the base member 3b is different from the pitch of the V-shaped grooves 15b on the other side of the base member 3b. For example, the V-shaped grooves 15a are used for splicing optical fiber core wires of 250 μm pitch, and the V-shaped grooves 15b are used for splicing optical fiber ribbons of 200 μm pitch.

As above, with the base member 3b, even if the V-shaped groove 15a and 15b are both for multi-core optical fibers on both faces, the pitch of the V-shaped grooves 15a on one side of the base member 3b is different from the pitch of the V-shaped grooves 15b on the other side of the base member 3b so that one piece of the base member 3b can be applied to a plurality of types of optical fiber ribbons, in which a plurality of optical fibers are aligned side-by-side and joined together, having different pitches.

Fourth Embodiment

Figure 14:
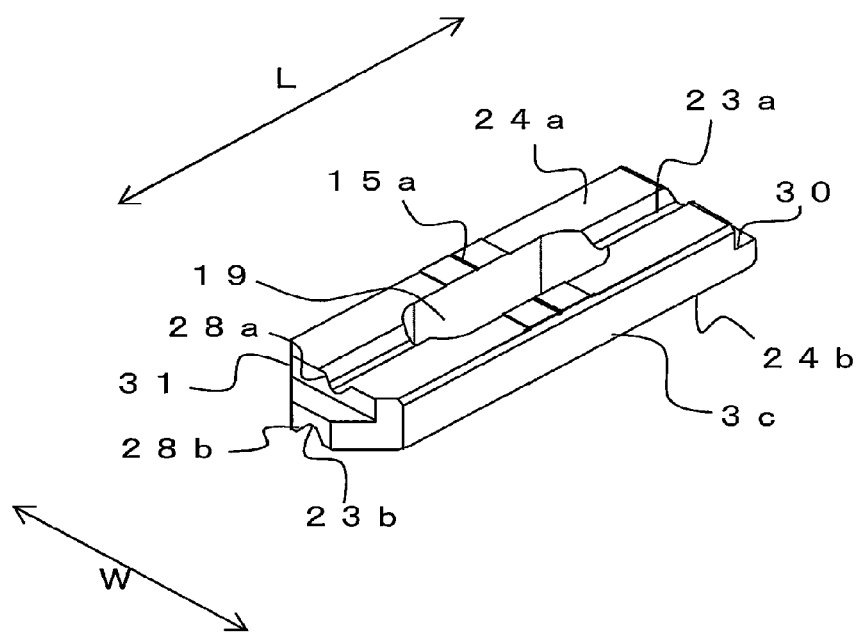
FIG. 14 is a perspective view showing a base member 3c.

FIG. 14 is a perspective view of a base member 3c. The base member 3c has the almost same structure as the base member 3 except that the length in the longitudinal direction of the base member on the top face is different from that on the reverse face and steps 30 are formed on both sides of the longitudinal direction of the base member 3c.

Because of the steps 30, the position of a V-shaped groove edge 28a, which is an edge part in the longitudinal direction of the V-shaped groove 23a on the top face 24a, is at a different position from the position of a V-shaped groove edge 28b, which is an edge part in the longitudinal direction of the V-shaped groove 23b on the reverse face 24b.

Figure 15A:
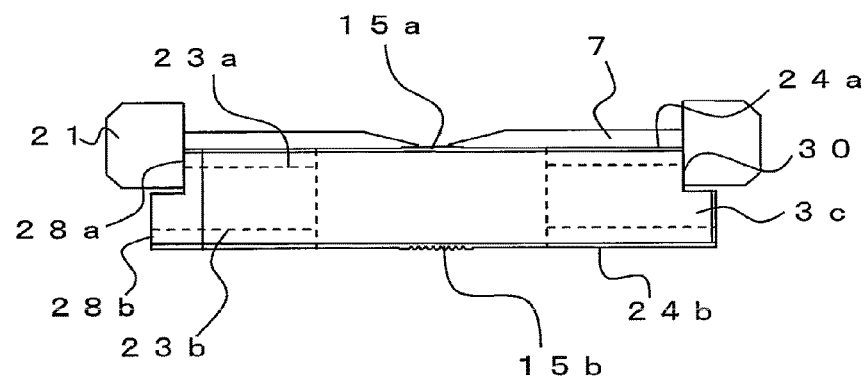
FIG. 15A is a drawing showing a state in which the electrode rods 7 are disposed on a top face 24a of the base member 3c.
Figure 15B:
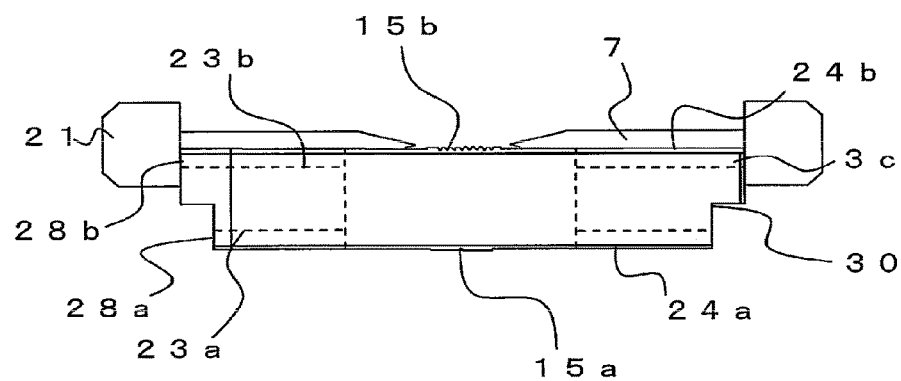
FIG. 15B is a drawing showing a state in which the electrode rods 7 are disposed on a reverse face 24b of the base member 3c.

FIG. 15A is a drawing showing a state in which the top face 24a side of the base member 3c is in use, and FIG. 15B is a drawing showing a state in which the reverse face 24b side of the base member 3c is in use. As mentioned above, the front face of the electrode head 21 is in contact with the side face of the base member to determine the tip positions of the electrode rods 7 against the base member.

As shown in FIG. 15A, when the top face 24a is in use, the front face of the electrode head 21 contacts the V-shaped groove edge 28a of the V-shaped groove 23a. On the other hand, as shown in FIG. 15B, when the reverse face 24b is in use, the front face of the electrode head 21 contacts the V-shaped groove edge 28b of the V-shaped groove 23b. As above, since the steps 30 are formed on the base member 3c, the positions of the V-shaped groove edges 28a and 28b in the longitudinal direction of the base member 3c differ. Thus, with a same pair of the electrode rods 7, the distance between the tips of the electrode rods 7 can be varied by changing between the top face and the reverse face of the base member 3c.

For example, when the V-shaped groove 15a on the top face 24a is for splicing single-core optical fibers, the tip distance between the electrode rods 7 is narrowed, and when the V-shaped groove 15b on the reverse face 24b is for splicing multi-core optical fibers, the tip distance between the electrode rods 7 is widened. As above, with the base member 3c, it is possible to set an appropriate distance between the electrode rods 7 according to the subjected optical fibers.

As above, by forming the steps 30 on at least one face of the base member 3c so that the edge position of the V-shaped groove 23a, which is formed on one face of the base member 3c, is at the different position from the edge position of the V-shaped groove 23b, which is formed on the other face of the base member 3c, it is possible to have the different tip distances of the electrode rods 7 on the top face and the reverse face. Thus, for example, if one of the faces is for splicing single-core optical fibers, the tip distance of the electrode rods 7 can be smaller; and if the other face is for splicing multi-core optical fibers, the tip distance of the electrode rods 7 can be larger. Thus, it is possible to set a tip distance of the electrode rods that is appropriate for the optical fibers to be fused.

Fifth Embodiment

Figure 16:
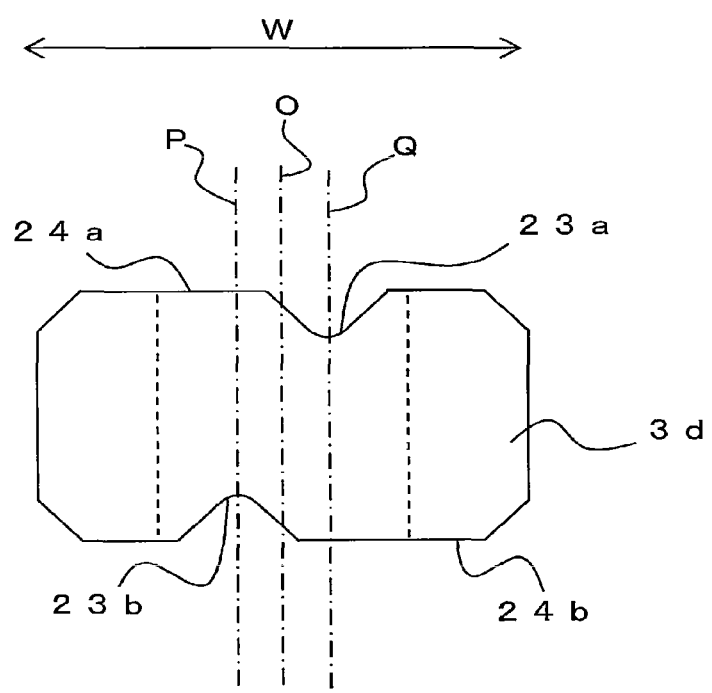
FIG. 16 is a side view of a base member 3d.

FIG. 16 is a drawing showing an external form of a base member 3d viewed from its short side. In the base member 3d, the position of the V-shaped groove 23a on the top face 24a in the width direction of the base member 3d and the position of the V-shaped groove 23b on the reverse face 24b in the width direction of the base member 3d are shifted from each other. That is, the base member 3d has the same structure as the base member 3 except that the V-shaped grooves 23a and 23b are arranged differently from the base member 3.

To be more specific, the center of the V-shaped groove 23a (Q in the drawing) and the center of the V-shaped groove 23b (P in the drawing) are shifted to each other in the opposite directions to the center of the width direction of the base member 3d (O in the drawing). The amount of shifting of the center of the V-shaped groove 23a (Q in the drawing) from the center of the width direction of the base member 3d (O in the drawing) is approximately the same as the amount of shifting of the center of the V-shaped groove 23b (P in the drawing) from the center of the width direction of the base member 3d (O in the drawing).

In this way, it is possible to make the position of the V-shaped grooves 23a on the top face 24a of the base member 3d being at a different position from the position of the V-shaped grooves 23b on the reverse face 24b of the base member 3d in the width direction of the base member 3d. Thus, compared to the case in which the V-shaped grooves 23a on the top face 24a and the V-shaped grooves 23b on the reverse face 24b are at the same position in the width direction of the base member 3d, the part that is supposed to be the thinnest part of the base member 3d can be thicker, and thus the base member 3d can be prevented from cracking.

Sixth Embodiment

Figure 17A:
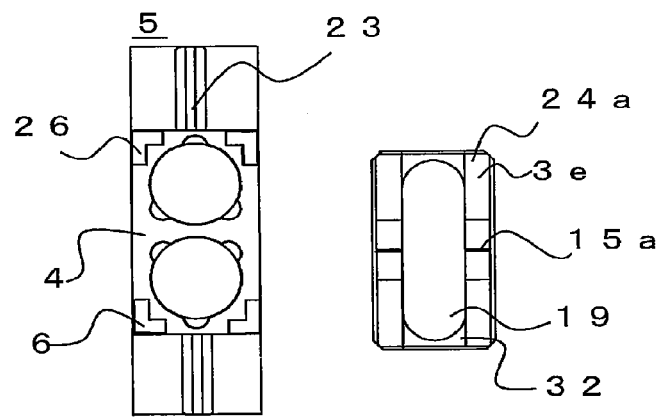
FIG. 17A is a drawing showing a state in which the base member 3 is removed from the base-holding member 5.
Figure 17B:
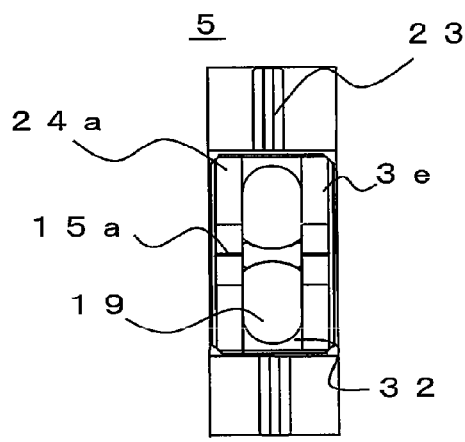
FIG. 17B is a drawing showing a state in which the base member 3 is installed on the base-holding member 5.

FIG. 17A is a plan view showing a state before a base member 3e is installed onto the base-holding member 5, and FIG. 17B is a plan view showing a state after the base member 3e is installed onto the base-holding member 5.

In the present embodiment, the base member 3e does not include the V-shaped grooves 23a and 23b. That is, the base member 3e includes the V-shaped grooves 15a and 15b formed on the top and the reverse faces respectively, but no V-shaped grooves that intersect with the same are formed. However, a recess portion 32 is provided so that the base member 3e does not come into contact with the electrode rods.

On both sides of the base-member container 4 in the longitudinal direction, the V-shaped grooves 23 are provided. That is, the V-shaped grooves 23 are formed on the base-holding member 5. Disposing the base member 3e into the base-member container 4 makes the V-shaped grooves 23 and the V-shaped grooves 15a and 15b intersect, with each other at, right, angles. Optical fibers can be fusion spliced by placing the electrode rods 7 on the V-shaped grooves 23 and optical fibers on the V-shaped grooves 15a and 15b.

As above, in the present invention, only the V-shaped grooves 15a and 15b for holding optical fibers may be formed on the base member 3e and the V-shaped grooves 23 for holding the electrode rods 7 may be provided on the base-holding member 5.

Like the first embodiment, it is preferable in any of the embodiments that the base-member installation part 26 should be provided at a place that does not correspond to the V-shaped groove on the reverse face of the base member 3 when installed. This can prevent V-shaped grooves from attaching dust and the like.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, the same V-shaped grooves may be formed on both the top and the reverse faces of the base member 3. In this way, when dust is attached to the V-shaped grooves, the base member 3 can be turned over to change from the top face to the reverse face, or vice versa, making it possible to continue fusion splicing, which can shorten the operation time.

In addition, the positions or the depths of the V-shaped grooves on the right and the left sides on at least one face of the base member 3 may be varied so that, when the same optical fibers are disposed, the center axis of the optical fibers are shifted for a predetermined amount. In this way, attenuation splicing, which is a way of splicing to obtain a predetermined amount of attenuation, can be performed.

Also, needless to say, each of the embodiments described above can be, for example, combined with each other.

DESCRIPTION OF NOTATIONS

1 . . . fusion splicer
2 . . . optical fiber installation surface
3, 3a, 3b, 3c, 3d, 3e . . . base member
4 . . . base-member container
5 . . . base-holding member
6 . . . vertical positioning reference part
7 . . . electrode rod
8 . . . horizontal positioning reference part
9, 9a . . . electrode-holding member
11 . . . holder mounting part
13 . . . recess portion
15a, 15b . . . V-shaped groove
17 . . . screw
19 . . . bore
21 . . . electrode head
22 . . . cover plate
23, 23a, 23b . . . V-shaped groove
24a . . . top face
24b . . . reverse face
25 . . . camera
26 . . . base-member installation part
27 . . . pressing member
28a, 28b . . . edge part of V-shaped groove
29 . . . chamfered portion
30 . . . step
31 . . . cutout portion
32 . . . recess portion
35 . . . elastic portion
37 . . . bore
39 . . . wall portion
41 . . . female screw

What is claimed is:

1. A base member to be used in a fusion splicer that joins optical fibers together, comprising:
a first V-shaped groove to hold optical fibers, and
a second V-shaped groove that holds electrode rods, the second V-shaped groove being formed in a longitudinal direction of the base member, which is a direction that intersects with the first V-shaped groove approximately at right angles, wherein
the first V-shaped groove is formed on each face of the base member; and
the second V-shaped grooves are formed on both faces of the base member.

2. The base member according to claim 1, wherein
the first V-shaped groove formed on one face of the base member is in a different form from the first V-shaped groove formed on another face of the base member.

3. The base member according to claim 2, wherein
the first V-shaped groove on one face of the base ember is for single-core optical fibers; and
the first V-shaped groove on another face of the base member is for multi-core optical fibers.

4. The base member according to claim 2, wherein
the first V-shaped grooves on both faces of the base member are both for multi-core optical fibers; and
a pitch of the first V-shaped groove on one face of the base member is different from a pitch of the first V-shaped groove on another face of the base member.

5. The base member according to, claim 2, wherein
a depth of the first V-shaped groove on one face of the base member is different from a depth of the first V-shaped groove on another face of the base member.

6. The base member according to claim 1, wherein
a length of at least one face of the base member in the longitudinal direction of the base member is different from a length of another face of the base member; and
an edge position of the second V-shaped groove formed on one face of the base member is at a different place from an edge position of the second V-shaped groove formed on another face of the base member.

7. The base member according to claim 1, wherein
in a width direction of the base member that intersects with the longitudinal direction of the base member at right angles, the position of the second V-shaped groove formed on one face of the base member is at a different place from the position of the second V-shaped groove formed on another face of the base member.

8. A fusion splicer that joins optical fibers together, comprising:
the base member comprising a first V-shaped groove to hold optical fibers; and
a base-holding member that holds the base member, wherein
the first V-shaped groove is formed on each face of the base member;

the base member can be attached to and detached from the base-holding member;

a horizontal positioning reference part, which determines the position of the base member on the base-holding member in a direction parallel to an optical fiber installation surface of the base member, is provided on the base-holding member;

a vertical positioning reference part, which determines the position of the base member on the base-holding member in a direction vertical to the optical fiber installation surface of the base member, is provided on the base-holding member; and the base member contacts with the vertical positioning reference part at parts other than the first V-shaped grooves.

* * * * *